US011340969B2

(12) United States Patent
Matsuura et al.

(10) Patent No.: US 11,340,969 B2
(45) Date of Patent: May 24, 2022

(54) PROCESSING SYSTEM FOR DATA DISTRIBUTION AND PROGRAM THEREOF

(71) Applicant: Hitachi, Ltd., Tokyo (JP)

(72) Inventors: Yoshiki Matsuura, Tokyo (JP); Tatsuhiko Miyata, Tokyo (JP); Jun Yoshihara, Tokyo (JP); Tetsuro Abe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 16/303,499

(22) PCT Filed: May 18, 2017

(86) PCT No.: PCT/JP2017/018651
§ 371 (c)(1),
(2) Date: Nov. 20, 2018

(87) PCT Pub. No.: WO2017/200037
PCT Pub. Date: Nov. 23, 2017

(65) Prior Publication Data
US 2020/0319946 A1     Oct. 8, 2020

(30) Foreign Application Priority Data

May 20, 2016     (JP) ............................. JP2016-100966

(51) Int. Cl.
*G06F 9/54* (2006.01)
*G06F 9/50* (2006.01)

(52) U.S. Cl.
CPC ............ *G06F 9/546* (2013.01); *G06F 9/5083* (2013.01); *G06F 9/547* (2013.01)

(58) Field of Classification Search
CPC ......... G06F 9/546; G06F 9/5083; G06F 9/547
See application file for complete search history.

(56) References Cited

U.S. PATENT DOCUMENTS 9,621,431 B1 *   4/2017   Cardente ................ H04L 41/12
2006/0026599 A1  2/2006   Herington et al.
(Continued)

FOREIGN PATENT DOCUMENTS

| JP | 2008-234651 A | 10/2008 |
| JP | 2013-186520 A | 9/2013 |
| JP | 2016-45802 A  | 4/2016 |

OTHER PUBLICATIONS

Kwon, Hui-Ung ; Kwak, Hu-Keun ; Chung, Kyu-Sik; A Distributed Layer 7 Server Load Balancing; 2008; pp. 199-210; 12 pages (Year: 2008).*

(Continued)

*Primary Examiner* — Doon Y Chow
*Assistant Examiner* — Kimberly L Jordan
(74) *Attorney, Agent, or Firm* — Crowell & Moring LLP

(57) ABSTRACT

In a processing system including a data distribution server and multiple processing servers, the data distribution server transfers data to any one of the multiple processing servers, and the processing server includes a server determination information storage unit in which load information on each of the multiple processing servers is stored and an application specific transfer determination information storage unit in which a condition to be transferred peculiar to an application is stored. A processing server in question generates a message upon determining to have received data including information identifying the application, identifies the application upon determining to have received the message, selects any processing server based on the information stored in the server determination information storage unit and the application specific transfer determination information storage unit, and executes the application or transfers the message to the selected processing server according to the selected processing server.

13 Claims, 10 Drawing Sheets

TABLE OF App A TRANSFER DETERMINATION INFORMATION STORAGE UNIT
(CACHE)

| PROCESSING SERVER NAME (601) | HELD CACHE INFORMATION (602) |
|---|---|
| Server A | BBBBB |
| Server B | XXXXX YYYYY |
| Server C | AAAAA 12345 |

TABLE OF App C TRANSFER DETERMINATION INFORMATION STORAGE UNIT
(ID TRAN)

| PROCESSING SERVER NAME (611) | HELD CACHE INFORMATION (612) |
|---|---|
| Server A | 100, 102, 104, 105 |
| Server B | 100, 103 |

(56) References Cited

U.S. PATENT DOCUMENTS

2017/0214737 A1\* 7/2017 Agarwal ............... H04L 69/326
2017/0214738 A1\* 7/2017 Agarwal ............... H04L 47/125

OTHER PUBLICATIONS

Associated PCT application publication WO2017200037A1, English translation from Google Patents; 11 pages (Year: 2021).\*
International Search Report (PCT/ISA/210) issued in PCT Application No. PCT/JP2017/018651 dated Jun. 13, 2017 with English translation (two (2) pages).
Japanese-language Written Opinion (PCT/ISA/237) issued in PCT Application No. PCT/JP2017/018651 dated Jun. 13, 2017 (three (3) pages).

\* cited by examiner

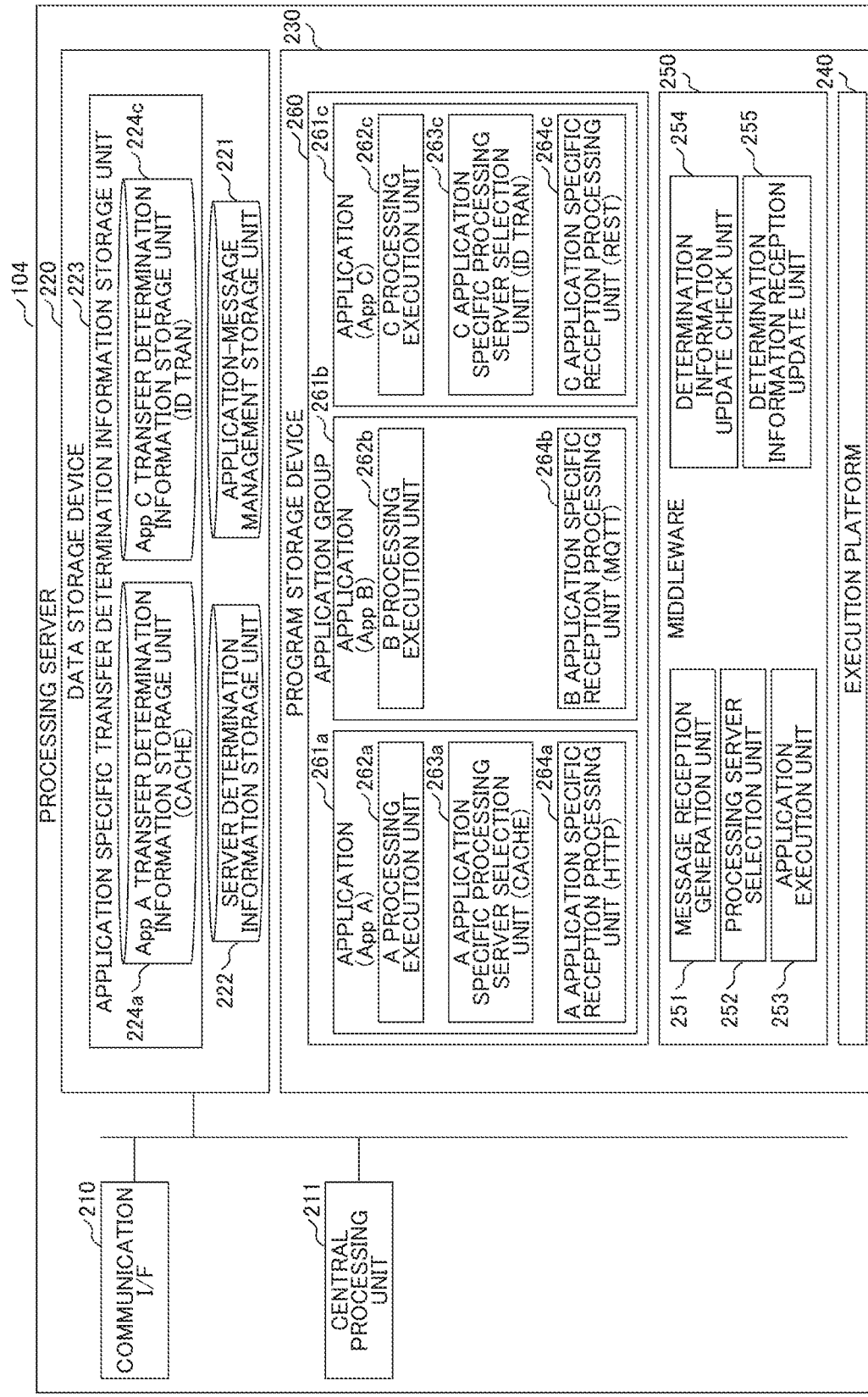

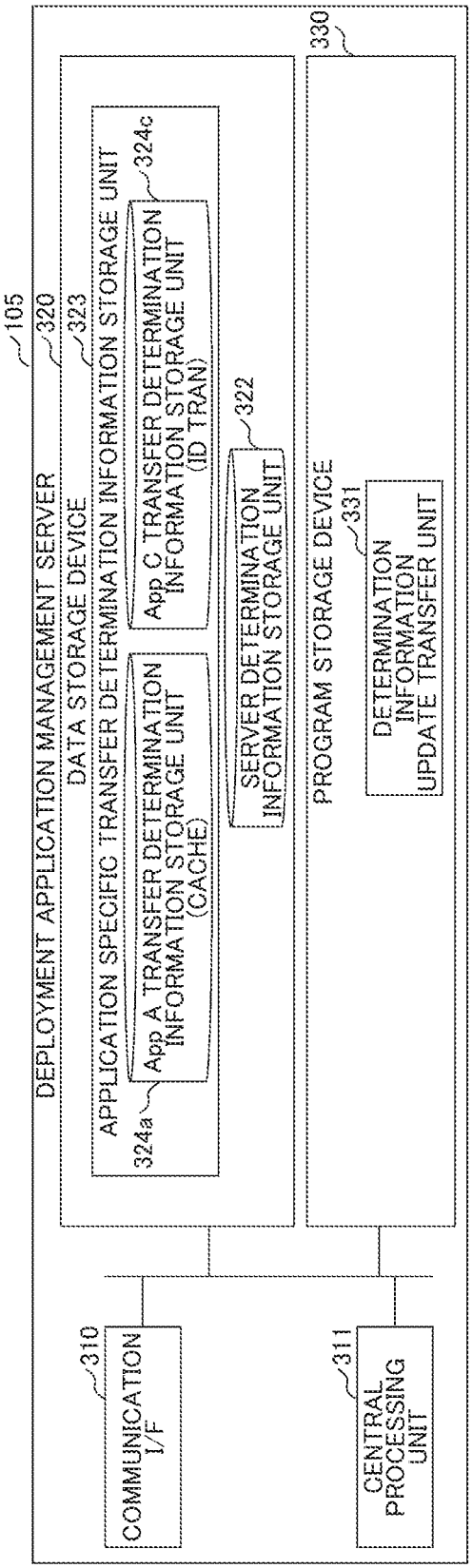

FIG. 5

TABLE OF SERVER DETERMINATION INFORMATION STORAGE UNIT

| PROCESSING SERVER NAME | DEPLOYMENT APPLICATION NAME | LOAD INFORMATION |
|---|---|---|
| Server A | App A<br>App B<br>App C | Busy |
| Server B | App A<br>App C | Busy |
| Server C | App A<br>App B | Free |

FIG. 6A

TABLE OF App A TRANSFER DETERMINATION INFORMATION STORAGE UNIT
(CACHE)

| PROCESSING SERVER NAME | HELD CACHE INFORMATION |
|---|---|
| Server A | BBBBB |
| Server B | XXXXX<br>YYYYY |
| Server C | AAAAA<br>12345 |

FIG. 6B

TABLE OF App C TRANSFER DETERMINATION INFORMATION STORAGE UNIT
(ID TRAN)

| PROCESSING SERVER NAME | HELD CACHE INFORMATION |
|---|---|
| Server A | 100, 102, 104, 105 |
| Server B | 100, 103 |

PROCESSING SYSTEM FOR DATA DISTRIBUTION AND PROGRAM THEREOF

TECHNICAL FIELD

The present invention relates to a processing system and a program thereof.

BACKGROUND ART

In recent years, in applications that leverage ample computing environments such as cloud and utilize data transmitted from client terminals such as servers, a high-performance processing system capable of dispersing a load while distributing a large amount of diverse data to appropriate applications has been desired.

In the background art in the above field, Patent Literature 1 discloses that a load balancer is prepared for each application, multiple processing servers for executing application data processing are deployed under the load balancer, and a load balancing is performed (FIG. 1).

Further, in Patent Literature 1, multiple applications are deployed in one processing server, and resources are dynamically allocated among the multiple applications according to load data and performance data on the applications, thereby being capable of leveraging computer resources among the applications different in a peak load period (paragraphs 0004, 0025).

CITATION LIST

Patent Literature

PTL 1: Japanese Unexamined Patent Application Publication No. 2008-234651

SUMMARY OF INVENTION

Technical Problem

With the use of the load dispersion system disclosed in Patent Literature 1, the load of data allocated to the applications can be efficiently dispersed by the multiple processing servers. However, when various data transmitted from the client terminals is distributed to the load dispersion device of an appropriate application, there may be a need to analyze a protocol different according to the application, and the load on the data distribution process cannot be ignored.

In other words, in the above case, the load of a series of data distribution processing for analyzing the protocol of a layer 7 level of the received data, identifying the application, and distributing the data to the load dispersion device according to the identified application, for distributing the data to the load dispersion device increases.

A device (for example, a load balancer capable of performing processing at the layer 7 level) that performs the data distribution processing becomes a bottleneck, and even if the number of processing servers is large, a large amount of data cannot be processed at all in the first place.

Incidentally, for example, HTTP (Hyper Text Transfer Protocol) REST (Representational State Transfer), MQTT (MQ Telemetry Transport), and the like are included as the protocol type at the layer 7 level.

On the other hand, Patent Literature 1 discloses routing to the load dispersion device by cluster aliasing (paragraph 0015), but there is no disclosure of a technology relating to a protocol analysis and an application identification process.

Also, in order to eliminate the bottleneck of the device that performs the data distribution process, it is conceivable that a load balancer that distributes the data to a device that performs multiple data distribution processes by the protocol analysis of a layer 4 level is deployed in front of a device that performs the data distribution process. However, the number of devices increases, which leads to an increase in cost.

The present invention has been made in view of the above problems, and it is an object of the present invention to provide a load dispersion processing system capable of dispersing a load of a data distribution process by a processing server in addition to dispersion of processing of data.

Solution to Problem

In order to achieve the above object, according to the present invention, there is provided a processing system including a data distribution device and a plurality of processing servers, in which the data distribution device receives data including information identifying an application program and transfers the received data or a message generated from the received data to any one of the plurality of processing servers, the processing server includes: a server determination information storage unit that stores registration information on an application program of each of the plurality of processing servers and load information on each of the plurality of processing servers; and an application-specific transfer determination information storage unit that stores a condition to be transferred peculiar to the application program, and the processing server receives the data or the message including the information identifying the application program, the processing server generates the message from the received data upon determining that the received data or message is data, the processing server identifies the application program from the received message upon determining that the received data or message is the message, the processing server selects any processing server from the plurality of processing servers based on the information stored in the server determination information storage unit and the application specific transfer determination information storage unit, the processing server executes the identified application program upon determining that the selected processing server is the processing server in question, and the processing server transfers the received or generated message to the selected processing server upon determining that the selected processing server is not the processing server in question.

Advantageous Effects of Invention

According to the present invention, the load distribution processing system in which the processing server can also distribute a load of the data distribution process, in addition to the dispersion of the data processing.

BRIEF DESCRIPTION OF DRAWINGS

FIG. 2 is a diagram showing an example of a configuration of a processing server.

FIG. 3 is a diagram showing an example of a configuration of a deployment application management server.

FIG. 4 is a diagram showing an example of a table of an application-message management storage unit.

FIG. 5 is a diagram showing an example of a table of a server determination information storage unit.

FIG. 6A is a diagram showing an example of a table of an application specific transfer determination information storage unit (cache).

FIG. 6B is a diagram showing an example of a table of an application specific transfer determination information storage (ID tran).

DESCRIPTION OF EMBODIMENTS

Figure 1:
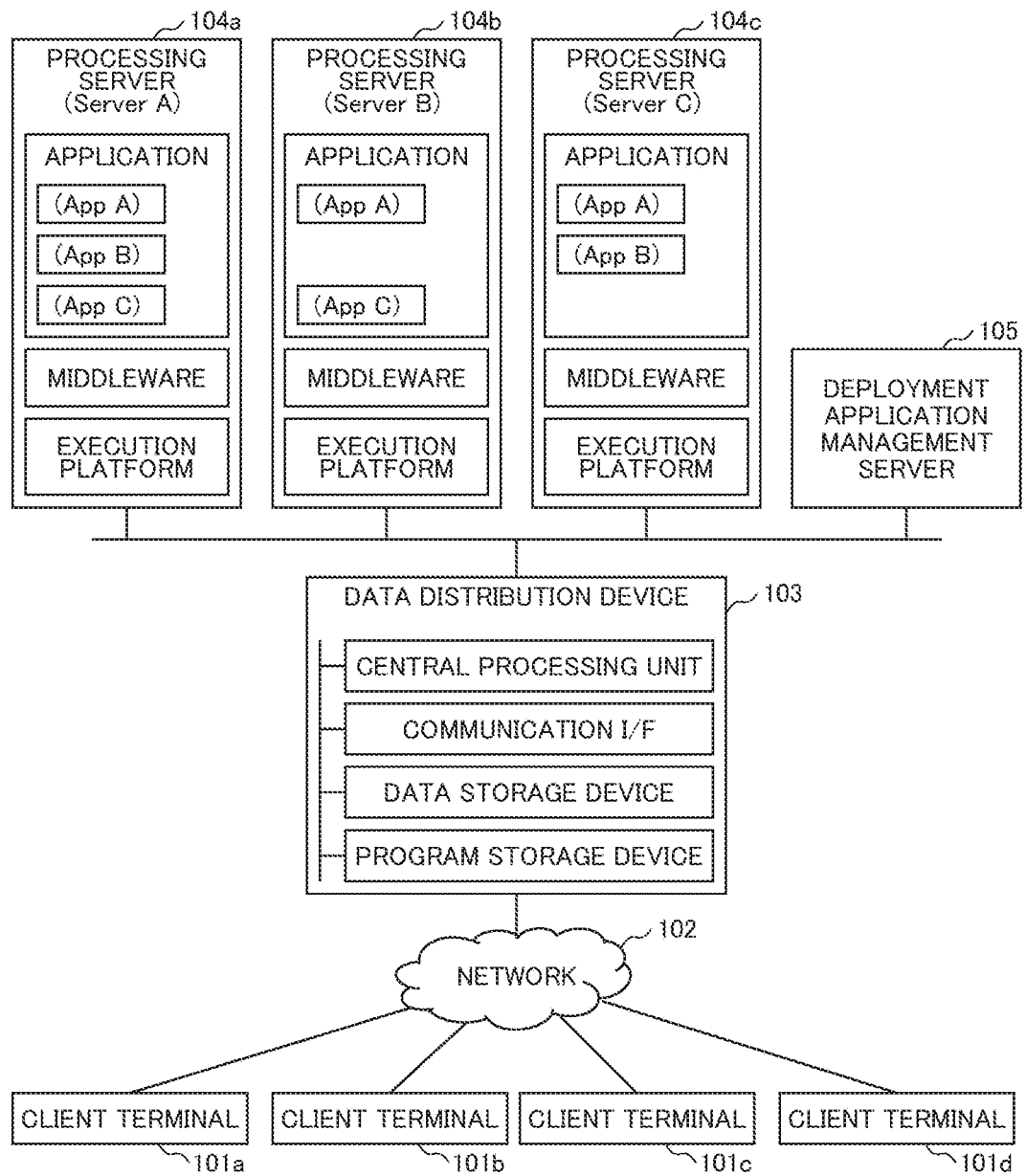
FIG. 1 is a diagram showing an example of the overall configuration of a system.

Hereinafter, embodiments of respective examples will now be described with reference to the drawings. In figures used in the following examples, parts denoted by the same reference numerals indicate the same parts, and their structures and operations are the same.

FIG. 1 shows an example of an overall configuration of a system. The system includes multiple client terminals 101 (client terminals 101a to 101d are typically not distinguished from each other and one of those client terminals is representatively represented by a client terminal 101, and other reference numerals or symbols are also denoted by the same notation), a data distribution device 103 that is connected to the client terminal 101 through a network 102 or the like, multiple processing servers 104 which is connected to the data distribution device 103, and a deployment application management server 105. In the system shown in FIG. 1, in particular, the data distribution device 103 and the processing server 104 may be referred to as a processing system.

The client terminal 101 is a terminal that generates and transmits data for executing application processing, and includes a data management server in a company and a factory, a communication device such as a smartphone or a tablet terminal, and in recent years, devices having a communication function such as sensor devices, smart meters, and vehicles having the communication function.

The network 102 is a wireless network or a wired network provided by a communication carrier or the like. The network 102 may include a network owned by an individual company or the like in a part of the network 102 or may be a network through which multiple types of protocols pass.

The data distribution device 103 is a device that receives data from the client terminal 101 and distributes the received data to the multiple processing servers 104. In the prior art (Patent Literature 1), routing or load distribution devices are used to distribute the data to a cluster node corresponding to a load dispersion device for each application or the application. In the present embodiment, with a reduction in a load of the distribution process in the data distribution device 103, even a single data distribution device 103 can process a large amount of data.

The data distribution device 103 may be, for example, a computer including a central processing unit, a communication I/F (interface), a data storage unit, and a program storage unit. Each of these devices may have the same structure as each of devices in the processing server 104, which will be described with reference to FIG. 2. In addition, a part of the operation of the central processing unit for executing a program stored in the program storage device is hardware such as an integrated circuit which operates in the same manner.

The processing server 104 is a server that executes processing of the application in accordance with the data transmitted from the client terminal 101. Execution of processing of the application is execution of an application program, and hereafter, the application program is abbreviated as an application.

FIG. 1 shows an example of a logical configuration of the processing server 104, and the processing server 104 has an execution platform and middleware for executing the application. The application may be different for each processing server 104, and in the example of FIG. 1, the processing server 104a has three applications (App A, App B, App C), the processing server 104b has two applications (App A, App C), and the processing server 104c has two applications (App A, App B). The configuration of the processing server 104 will be described in detail with reference to FIG. 2.

The deployment application management server 105 is a server that manages the type of application installed in the processing server 104, load information on the processing server 104, information related to the execution of the application, and so on. The configuration of the deployment application management server 105 will be described in detail with reference to FIG. 3.

In this example, although these servers illustrate examples of separate physical machines, these servers may be separate virtual machines of the same physical machine, may be separate virtual machines of different physical machines, or may be mixed as a physical machine and a virtual machine.

FIG. 2 shows an example of the configuration of the processing server 104. The processing server 104 includes a communication I/F 210 that communicates with the outside, a data storage device 220 that stores information to be persisted, a program storage device 230 in which the programs are stored, and a central processing unit 211 for reading and executing necessary information and programs from the data storage unit 220 and the program storage unit 230, which are components of a general computer and connected to each other by a bus.

The communication I/F 210 is, for example, an interface which is connected with Ethernet (registered trademark) for communicating with other processing servers 104 and the data distribution device 103. The communication I/F 210 may be controlled by a program of the execution platform 240 which will be described later, and in particular, protocols of a layer 4 or higher level may be processed by the program.

The data storage device 220 in the processing server 104 includes an application-message management storage unit 221 in which a relationship between a message corresponding to data transmitted from the client terminal 101 and an application 261 is stored, a server determination information storage unit 222 in which information on the application 261 mounted in each processing server 104 and load information on the processing server 104 are stored, and an application specific transfer determination information storage unit 223 in which, when there is a condition peculiar to the application 261 for determining whether to transfer between the processing servers 104, information on a fact that there is the condition is stored.

Each of the application-message management storage unit 221, the server determination information storage unit 222, and the application specific transfer determination information storage unit 223 may be a different storage area in the data storage device 220. Also, the data storage device 220 may be configured by a hard disk drive, a solid state drive, a flash memory, or the like.

In this example, the message is information used for data transfer between the processing servers 104, and may be information for identifying the combination of types or kinds of multiple pieces of data to be transferred, or information for identifying the combination of variable names of the multiple pieces of data to be transferred. In this way, the message per se may be information indicating what kind of data is combined together instead of the content of the data.

Further, the message may be information corresponding to the application 261 or may be information representing the combination of items of data to be processed by the application 261. The message may be transferred together with data indicated by information on the message, and is transferred according to a protocol uniquely defined between the processing servers 104.

As examples of the application specific transfer determination information storage unit 223, in FIG. 2, there are an App A transfer determination information storage unit (cache) 224a used when utilizing data held in a cache of each processing server 104 as the transfer determination process of the application 261a (App A), and an App C transfer determination information storage unit (ID tran) 224c used when a transaction having the same ID is executed by the same processing server 104 as the transfer determination process of the application 261c (App C). Those storage units will be described in detail with reference to FIGS. 6A and 6B.

The program storage device 230 in the processing server 104 includes three of an execution platform 240, a middleware 250, and an application group 260. The execution platform 240 is an execution environment of Java (registered trademark), Apache Hadoop (registered trademark), or the like. The execution platform 240 is a program which is an environment for executing a dispersion process and is an environment for executing the program. In addition, the execution platform 240 may include an OS (operating system), and the OS may include a part of a communication protocol stack.

The middleware 250 is a so-called middleware which is a program providing a framework that operates on the execution platform 240, for embedding a common function used by the multiple applications 261 of the application group 260 and an individual function of each of the applications 261. For that purpose, the middleware 250 may be a set of programs having an interface with the application group 260 (application 261) and/or an interface with the execution platform 240.

The middleware 250 includes a message reception generation unit 251 for generating a message based on the data transmitted from the client terminal 101 or for receiving the message transferred from another processing server 104, a processing server selection unit 252 that selects the processing server 104 for executing the application, that is, the processing execution unit 262 on the generated or received message, and an application execution unit 253 that calls and executes the processing execution unit 262.

Further, the middleware 250 includes a determination information update check unit 254 that notifies the deployment application management server 105 of update information when the application 261 is executed to update information in the server determination information storage unit 222 or the application specific transfer determination information storage unit 223, and a determination information reception update unit 255 that updates the server determination information storage unit 222 or the application specific transfer determination information storage unit 223 upon receiving a notification for updating the server determination information or the application specific transfer determination information on another processing server 104 from the deployment application management server 105.

In this example, in addition to identifying the application 261 upon receiving the common message between the processing servers 104, the message reception generation unit 251 activates the application specific reception processing unit 264 that can be newly added by a developer of the application 261 so as to be able to receive a different protocol different for each application 261, and allows the application specific reception processing unit 264 to stand by so as to be able to receive data of the multiple protocols. The message reception generation unit 251 and the processing server selection unit 252 will be described in detail with reference to FIGS. 7 and 8.

The application group 260 includes one or multiple applications 261. The processing execution unit 262 of the application 261 is a main program for performing an operation according to the message. The application group 260 may include, in addition to the processing execution unit 262, an application specific processing server selection unit 263 to be added when it is desired to perform the transfer determination process under a condition peculiar to the application 261, and an application specific reception processing unit 264 that receives data of a different protocol for each application 261 and generates a message.

As a result, the developer of the application 261 is to develop three units of the processing execution unit 262, the application specific processing server selection unit 263, and the application specific reception processing unit 264. When these three units are set as one application 261 and deployed in each processing server 104, each of the deployed processing servers 104 operates as a cluster capable of executing the application.

In addition, the present invention is not limited to a configuration in which these three units are set, but the application specific reception processing unit 264 may be deployed in each of a large number of processing servers 104, and the process executing unit 262 and the application specific processing server selection unit 263 may be deployed in each of the processing servers 104 of a small number corresponding to the processing amount of the application among the processing servers 104 in which the application specific reception processing unit 264 is deployed.

As a result, the protocol of data can be analyzed by the large number of processing servers 104, any processing server 104 is selected from the processing servers 104 in which the processing execution unit 262 is deployed, and data (message) is transferred to the selected processing server 104. In the configuration described above, two units of the processing execution unit 262 and the application specific processing server selection unit 263 may be configured by the application 261, and the application specific reception processing unit 264 may not be included in the application 261. Alternatively, the processing execution unit 262 may be configured by the application 261.

Each unit included in the program storage device 230 is a program read and executed by the central processing unit 211. Alternatively, two or more units may configure one program. In the following description, each unit included as a subject in the program storage device 230 may be placed with the central processing unit 211 that reads and executes each unit as the subject. The program storage device 230 may be a memory. Each unit included in the storage device 230 may also be stored in the data storage device 220 and loaded from the data storage device 220 or may be loaded from the communication I/F 210 or from a reading device of a storage medium not shown.

As described above, the application specific processing server selection unit 263 and the application specific reception processing unit 264 delegate the protocol analysis process and the server selection process, which have been performed by the data distribution device 103 up to now, to the processing server 104 side, thereby being capable of reducing a processing load of the data distribution device 103.

FIG. 3 shows an example of the configuration of the deployment application management server 105. The deployment application management server 105 is a server that manages the latest server determination information or application specific transfer determination information notified from each processing server 104 and delivers the managed determination information to other processing servers 104 than the notifying processing server 104. The notifying processing server 104 may be included in a delivery destination.

As shown in FIG. 3, the deployment application management server 105, like the processing servers 104, includes a communication I/F 310 that communicates with the outside, a data storage device 320 that stores persistent information, a program storage device 330 that stores program processing, and a central processing unit 311 that reads and executes necessary information and programs from the data storage unit 320 and the program storage unit 330, which are components of a general computer and connected to each other by a bus.

The data storage device 320 in the deployment application management server 105 includes a server determination information storage unit 322 and an application specific transfer determination information storage unit 223, which hold the latest information of the server determination information and the application specific transfer determination information held by each processing server 104, respectively. Each processing server 104 holds information relating to the application 261 that is located in the processing server 104 in question. On the other hand, if the application 261 is located in one of the processing servers 104, the deployment application management server 105 also holds information on the placed application 261.

The program storage device 330 in the deployment application management server 105 includes a determination information update transfer unit 331 that updates the server determination information storage unit 322 and the application specific transfer determination information storage unit 323 to provide the latest information on the basis of the server determination information or the application specific transfer determination information notified from each processing server 104, extracts the processing server 104 holding information before update, and delivers the latest information to the extracted processing server 104.

The determination information update transfer unit 331 is a program read and executed by the central processing unit 311. In the following description, the determination information update transfer unit 331 as a subject may be replaced with the central processing unit 311 that reads and executes the determination information update transfer unit 331 as the subject. The program storage device 330 may be a memory and the determination information update transfer unit 331 may also be stored in the data storage device 320 and loaded from the data storage device 320, or may be loaded from the communication I/F 310 or from a reading device of a storage medium not shown.

The determination information update check unit 254 of each processing server 104 gives notification of a fact that the information of the server determination information storage unit 222 or the application specific transfer determination information storage unit 223 in the processing server in question has been updated, or the updated information with detection of the operation to be updated through the communication I/F 210. The determination information update transfer unit 331 of the deployment application management server 105 receives the notification through the communication I/F 310, and updates the server determination information storage unit 322 or the application specific transfer determination information storage unit 323 based on the notified update information, and delivers the updated information through the communication I/F 310.

The delivery may be destined for the extracted processing server 104 for holding the information before update. The determination information reception update unit 255 of the processing server 104 receives the delivery through the communication I/F 210, and updates the server determination information storage unit 222 or the application specific transfer determination information storage unit 223 in the processing sever in question based on the delivered update information.

It is sufficient that the processing server selection unit 252 of the processing server 104 can refer to the latest server determination information and application specific transfer determination information. For example, not the processing server 104 but the deployment application management server 105 may hold these pieces of information, and the processing server 104 may access the deployment application management server 105 every time the processing server selection unit 252 refers to the held information.

However, when a ratio of the processing load in the processing server selection unit 252 to that in the processing execution unit 262 becomes larger, the processing load becomes overhead of processing of the application and the effect of load dispersion becomes smaller. For that reason, it is preferable that the processing server selection unit 252 refers to the server determination information storage unit 222 and the application specific transfer determination information storage unit 223 in the processing server 104 so that the ratio of the processing load of the processing server selection unit 252 does not become large.

FIG. 4 shows an example in which the application-message management storage unit 221 held in the processing server 104 is configured by a table. Information defining a relationship between the application 261 and the message is stored in the application-message management storage unit 221. In this example, the table includes an application name 401 identifying the application 261 and a message type 402 identifying the message, and information on the application name 401 and information on the message type 402 are associated with each other.

"App A", "App B", and "App C" of the application name 401 identify the application 261a, the application 261b, and the application 261c shown in FIG. 2, respectively. The information stored in the application-message management storage unit 221 is set in advance through the communication I/F 210 or by an input device not shown.

FIG. 5 shows an example in which the server determination information storage units 222 and 322 held in the processing server 104 and the deployment application management server 105 are configured as tables. In the server determination information storage units 222 and 322, the information on the application 261 deployed in each processing server 104 and the load information on each processing server 104 are stored.

In this example, the table includes a processing server name 501 that identifies the processing server 104, a deployment application name 502 that represents the application 261 deployed in the processing server 104, and load information 503 indicating the load state of the processing server 104, and these pieces of information are associated with each other. "Server A", "Server B", and "Server C" of the processing server name 501 identify the processing server 104a, the processing server 104b, and the processing server 104c shown in FIG. 1, respectively.

The "App A" of the deployment application name 502 corresponds to the "App A" of the application name 401. The load state of the load information 503 may be guided by a load of the central processing unit 211 and the amount obtained by multiplying the amount of message allocated to the procession execution unit 262 and waiting for processing by a predetermined weighting factor. The expression of the load state may be "Busy" or "Free", or may be a numerical value or the like.

Information on the processing server name 501 and the deployment application name 502 may be set in advance through the communication I/F 210 or an input device not shown, and the information of the load information 503 may be periodically detected and updated by the central processing unit 211. Alternatively, an operation management server or the like different from the system shown in FIG. 1 may monitor each processing server 104, collect the load states, and periodically update the collected load states.

FIG. 6A shows an example in which App A transfer determination information storage units (caches) 224a and 324a held in the processing server 104 and the deployment application management server 105 are configured as tables. In the App A transfer determination information storage units (caches) 224a and 324a, information that identifies data cached in each processing server 104 that has executed the application 261a (App A) in the past upon execution of the application 261a (App A) and then held as the cache is stored.

In this example, the table includes a processing server name 601 that identifies the processing server 104 and held cache information 602 that represents the information of on the cache data by the processing server 104, and these pieces of information are associated with each other. The "Server A" of the processing server name 601 coincides with the "Server A" of the processing server name 501 corresponding to "App A" of the deployment application name 502.

"AAAAA" in the held cache information 602 and the like may be information that can identify the cache data. When the amount of data is small, "AAAAA" may be the contents per se of the cache data, or may be an identifier allocated to identify the contents of the cache data, a hash function value of the cache data, or the like.

The information on the processing server name 601 is set in advance through the communication I/F 210 or an input device not shown, and the information of the held cache information 602 may be updated by the central processing unit 211 during processing of the cache.

FIG. 6B shows an example in which the App C transfer determination information storage units (ID tran) 224c and 324c held in the processing server 104 and the deployment application management server 105 are configured by tables. The App C transfer determination information storage units (ID tran) 224c and 324c store transaction IDs related to the application 261c (App C) currently being processed by each processing server 104.

In this example, the table includes a processing server name 611 that identifies the processing server 104 and a processing ID 612 that is an ID of transaction related to the application 261 which is currently being processed by the processing server 104, and these pieces of information are associated with each other. The "Server A" of the processing server name 611 and the like coincide with the "Server A" of the processing server name 501 corresponding to "App C" of the deployment application name 502, and the like.

The information on the processing server name 611 is set in advance through the communication I/F 210 or an input device not shown, and the information on the ID 612 in processing may be updated by the central processing unit 211 at the time of activation or termination of the transaction.

Figure 7:
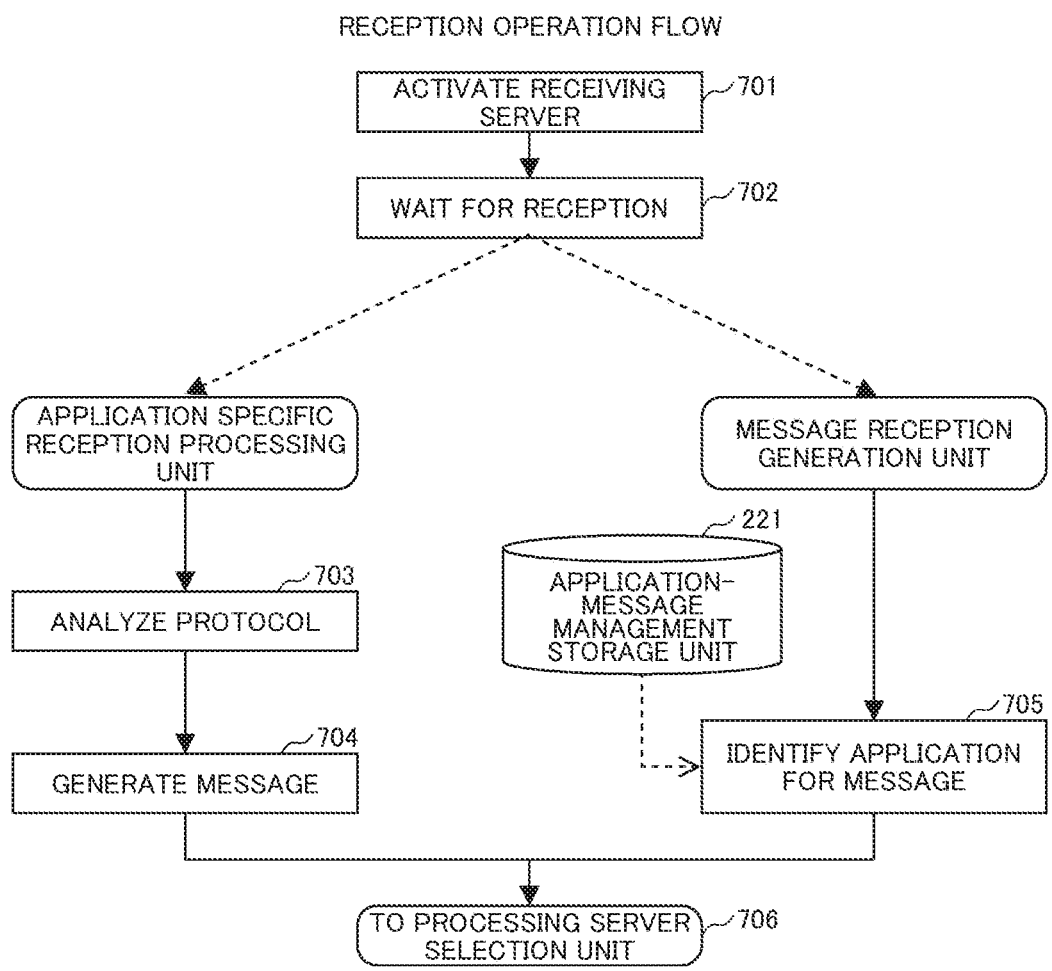
FIG. 7 is a diagram showing an example of an operation flow of data or message reception.

FIG. 7 shows an example of an operation flow of receiving data or a message from the processing server 104. First, in order to receive the data and messages of various protocols, the middleware 250 or the message reception generation unit 251 brings each of the application specific reception processing units 264 and the message reception generation unit 251 into a receivable state. Specifically, the middleware 250 or the message reception generation unit 251 brings a reception server included in each of the application specific reception processing units 264 and a reception server included in the message reception generation unit 251 into an activated state (Step 701).

For example, a server for receiving the message is a receiving server for waiting for receiving with a TCP (Transmission Control Protocol) port number 12345, and a server for receiving the application protocol is a receiving server such as an HTTP server or MQTT server.

The receiving server of the application protocol may be activated one by one for each application 261, and in the case of the same protocol even for a different application 261, only one reception server may be used, and the application 261 may be identified according to an identifier in data. In this way, in the case of the same protocol, the application specific reception processing unit 264 may be shared between the applications 261. When the reception servers are activated, each reception server waits for receiving the message or data (Step 702).

When the processing server 104 receives the data, for example, when the data transmitted from the client terminal 101 is data of an HTTP protocol, that is, data to be processed by the application 261a (App A), an A application specific reception processing unit 264a in the application 261a receives the data, analyzes the protocol (Step 703), and generates one or multiple messages corresponding to the application 261a (App A) (Step 704).

Then, in order to select any processing server 104, the process proceeds to processing which will be described with reference to FIG. 8 (Step 706). In this example, since the data includes the information identifying the application 261, there is no need to perform processing for identifying the application 261 from the data. However, since the message does not include the information per se for identifying the application 261, the following processing is performed.

When the processing server 104 receives the message, for example, when the processing server 104 receives a message converted by another processing server 104 or the like instead of a message from the client terminal 101, the processing server 104 searches the message type 402 of the application-message management storage unit 221 by the received message, acquires information on the application name 401 corresponding to the received message, and identifies the application 261 (Step 705). Then, in order to select any processing server 104, the processing proceeds to processing which will be described with reference to FIG. 8 (Step 706).

When the communication I/F 210 of the processing server 104 receives the data or the message, a protocol stack included in the OS of the execution platform 240 may process the TCP in the same manner as the general computer operation, call a program corresponding to a TCP port number, and pass the data or message.

For example, the OS may call any one of the reception server of the message reception generation unit 251, a reception server of the A application specific reception processing unit 264a, a reception server of a B application specific reception processing unit 264b, and a reception server of a C application specific reception processing unit 264c according to the port number whose association has been set in advance. Also, the message reception generation unit 251 may call a program corresponding to the TCP port number.

Figure 8:
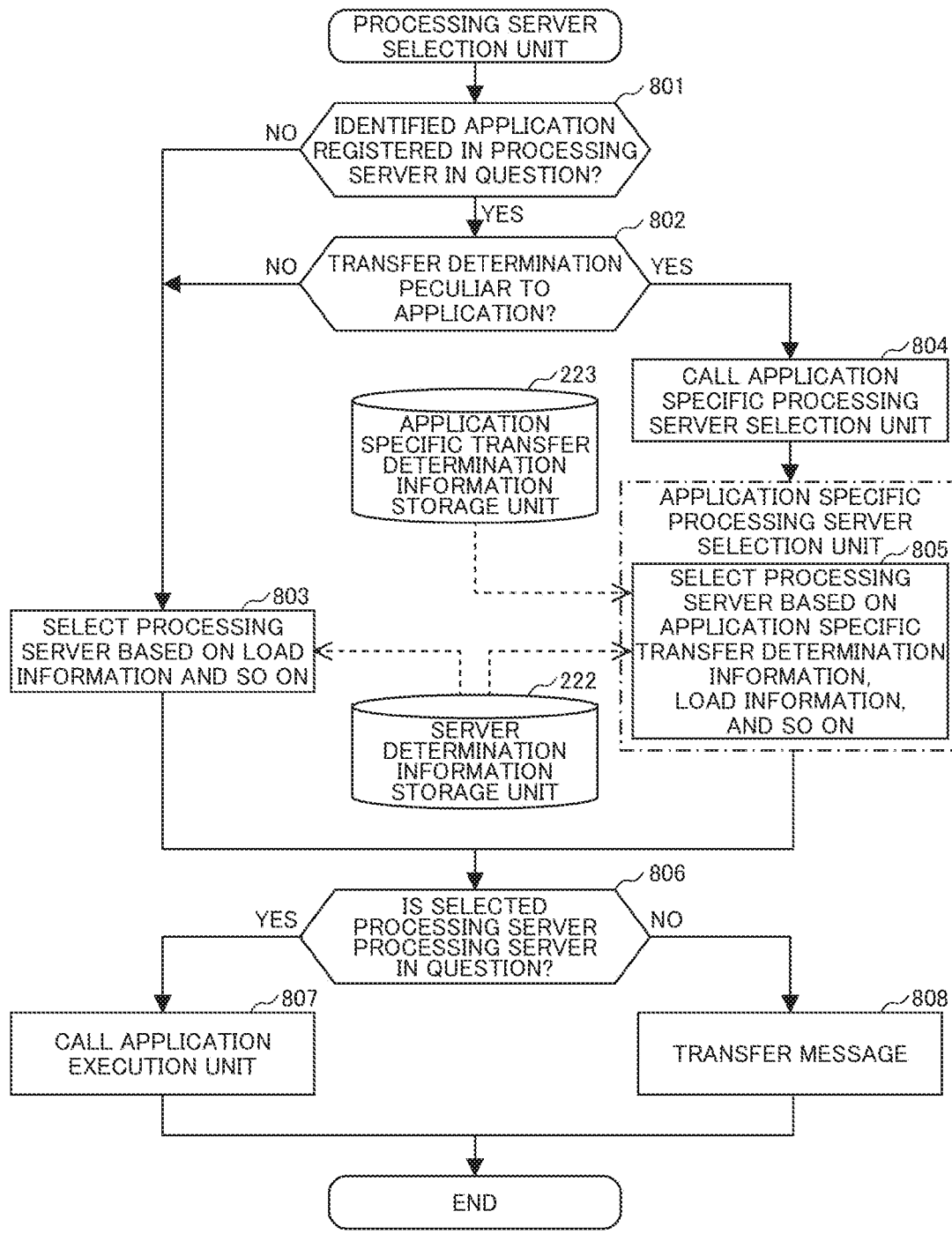
FIG. 8 is a diagram showing an example of an operation flow of processing server selection.

FIG. 8 shows an example of an operation flow of the processing server selection of the processing server 104. First, the processing server selection unit 252 determines whether the application 261 identified by the message reception generation unit 251 or the application 261 identified by information included in the data has been registered in the processing server 104 in question that executes the determination, or not (Step 801). In this situation, the processing server selection unit 252 may acquire the data from the application specific reception processing unit 264.

For that purpose, the processing server selection unit 252 may search the processing server 104 of the processing server selection unit 252 in question which executes Step 801 with the processing server name 501 of the server determination information storage unit 222, and determine whether or not the identified application 261 has been registered in the deployment application name 502 corresponding to the processing server 104 matched by search.

When the processing server selection unit 252 determines that the identified application 261 has been registered, the processing server selection unit 252 further determines whether or not there is a transfer judgment process under a condition peculiar to the application 261 (step 802). For example, When the identified application 261 is the application 261a (App A), the processing server selection unit 252 may determine that there is an A application specific processing server selection unit (cache) 263a, or when the identified application 261 is the application 261b (App B), the processing server selection unit 252 may determine that there is no transfer determination process under a condition peculiar to the application 261b.

When the processing server selection unit 252 makes a determination of No in Step 801 or Step 802, the processing server selection unit 252 selects the processing server 104 including the identified application 261 as the deployment application name 502 based on the server determination information storage unit 222 (Step 803). When there are multiple processing servers 104 including the identified application 261 as the deployment application name 502, the processing server selection unit 252 may select the processing server 104 small in load from the multiple processing servers 104 as the above selection, may simply select the processing servers 104 in a round-robin manner, or may select the processing server 104 with information independent of other applications 261 than the identified application 261. The selection is standardly supported as the middleware 250.

If the determination is YES in Step 802, the processing server selection unit 252 calls the transfer determination process under the condition peculiar to the identified application 261 (Step 804). The called application specific processing server selection unit 263 selects any processing server 104 with the use of the information on the application specific transfer determination information storage unit 223 and the server determination information storage unit 222 (Step 805).

For example, when the identified application 261 is the application 261a (App A), the A application specific processing server selection unit (cache) 263a is called, and the A application specific processing server selection unit (cache) 263a selects the processing server 104 with a small load while prioritizing the processing server 104 holding the cache data based on the information on the App A transfer determination information storage unit (cache) 224a and the server determination information storage unit 222.

In this example, when there are the multiple processing servers 104 that hold the same cache data, those multiple processing servers 104 may be identified, and the processing server 104 with a relatively small load may be selected from the identified processing servers 104. In addition, when the loads are the same among the identified processing servers 104, for example, the processing servers 104 may be selected in the round-robin manner.

Next, the processing server selection unit 252 determines whether the selected processing server 104 is the processing server 104 in question, or not (Step 806). When the processing server selection unit 252 determines that the selected processing server 104 is the processing server 104 in question, the processing server selection unit 252 calls the application execution unit 253 (Step 807). The application execution unit 253 calls the application 261. For example, when the identified application 261 is the application 261a (App A), the application execution unit 253 calls the A processing execution unit 262a.

If it is determined in Step 806 that the processing server 104 is not the processing server 104 in question, the processing server selection unit 252 transfers the message received in Step 802 or the message generated in Step 704 to the processing server 104 selected in Step 803 or Step 805 (Step 808).

Figure 9:
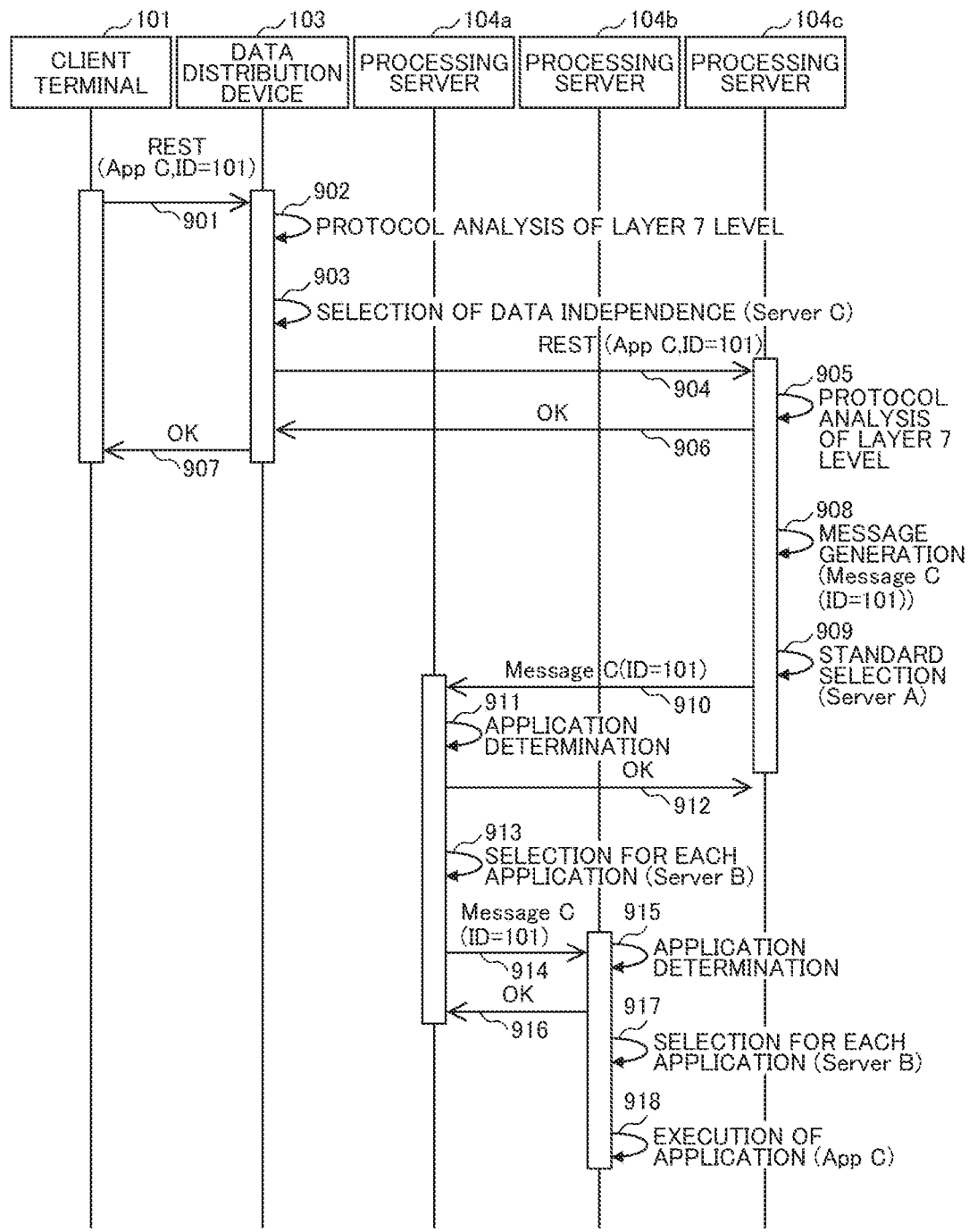
FIG. 9 is a diagram showing an example of an operation sequence for simply transferring to the processing server by a data distribution device.

FIG. 9 shows an example of an entire operation sequence in which the operation flows described with reference to FIGS. 7 and 8 are combined together. The operation sequence is an example using the data distribution device 103 that analyzes a protocol of a layer 4 level and selects the processing server 104 without depending on the data.

Each of the processing servers 104a, 104b, and 104c includes the processing execution unit 262 and the application specific processing server selection unit 263 in each application 261 as indicated by "App A", "App B", and "App C" shown in FIG. 1. In addition, each of the processing servers 104*a*, 104*b*, and 104*c* includes at least the C application specific reception processing unit 264*c*.

First, the client terminal 101 transmits data 901 having a transaction ID of "101" corresponding to "App C" by using REST as the protocol. The data distribution device 103 subjects the received data 901 to the protocol analysis of the TCP which is the layer 4 level (Step 902), selects the processing server 104*c* of a transfer destination by lightweight processing such as round robin (Step 903), and transfers the selected processing server 104*c* as data 904 as it is.

In this example, it is assumed that the processing server 104*c* is selected by the round robin, but the processing server 104*c* cannot execute the processing of the application 261*c* because the C processing execution unit 262*c* for "App C" has not been registered.

The processing server 104*c* performs the protocol analysis of "App C" at the layer 7 level by the C application specific reception processing unit 264*c* (Step 905), returns OK 906 to the data distribution device 103, generates a message (Message C) (Step 908), and selects a standard support of Step 803 shown in FIG. 8 (Step 909).

In the selection of the standard support, the processing server 104 corresponding to "App C" and having the smaller load is selected from the server determination information storage unit 222, and when there are multiple processing servers 104 having the same load, the "Server A" (processing server 104*a*) is selected from the multiple processing servers 104 by round robin. The processing server 104*c* transfers a message 910 to the selected processing server 104*a*.

In this example, since the C application specific processing server selection unit 263 *c* for "App C" has not been registered either in the processing server 104*c*, the middleware 250 selects the processing server 104*a* according to the standard supported selection.

Upon receiving the message 910, the processing server 104*a* identifies "App C" (application 261*c*) corresponding to the message 910 (Message C) according to the application-message management storage unit 221 (Step 911), and returns OK 912. In addition, since there is a transfer determination process under a condition specific to the application 261*c*, the C application specific processing server selection unit 263*c* is called up and selects the processing server 104 (Step 913).

In the above selection, since the transaction ID included in the data of the message 910 is "101", "Server B" (processing server 104*b*) is selected with reference to the App C transfer determination information storage unit (ID tran) 224*c*. According to the above selection, the processing server 104*a* further transfers the same message 914 as the message 910 to the processing server 104*b*.

Upon receiving the message 914, the processing server 104*b* identifies the corresponding application 261*c* from the application-message management storage unit 221 in the same manner as that in the processing server 104*a* (Step 915), returns an OK 916. In addition, since there is the transfer determination process under a condition specific to the application 261*c*, the C application specific processing server selection unit 263*c* is called, and selects the processing server 104*b* in question (Step 917), calls the C processing execution unit 262*c* of the application 261*c* (App C), and processes the application (Step 918).

As described above, even if the data distribution device 103 appropriately selects the processing server 104 without performing the processing of the layer 7 level and the processing of the load of the processing server 104, the data is transferred to the processing server 104 corresponding to the layer 7 level and the load, and the processing is executed. The processing which has been the processing load of the conventional data distribution device can be delegated to the processing server 104 side, and the data distribution device 103 can distribute even various kinds of data including a large amount of data and multiple protocols to the processing servers 104 and disperse the load without bottlenecking.

Furthermore, since the data distribution device 103 can transfer data by protocol analysis at the layer 4 level, as a result of which the data distribution device 103 can introduce a commercially available load balancer as the data distribution device 103 without depending on the protocol of the layer 7 level and the placement of the application 261.

However, as described above, when the protocol analysis, the message generation, and the application specific transfer determination process are performed on the processing server 104 side, a load on the processing server 104 increases, and even though the data distribution device 103 has a margin, there are cases in which the number of processing servers 104 has to be expanded.

Therefore, with the use of an example in which the protocol of the layer 7 level is analyzed and the message is generated, but the message is transferred to the processing server 104 without identifying the application 261, an example in which the processing server 104 in which the application 261 has been registered is selected and transferred, and an example in which the transfer determination process for each application is performed, and then any processing server 104 is selected and transferred, in addition to an example of transferring the layer 7 level protocol to the processing server 104 without analyzing the layer 7 level protocol on the side of the data distribution device 103 as described above, a fact that the processing server 104 can cope with a stepwise change in the processing contents of the data distribution device 103 will be described below.

Figure 10:
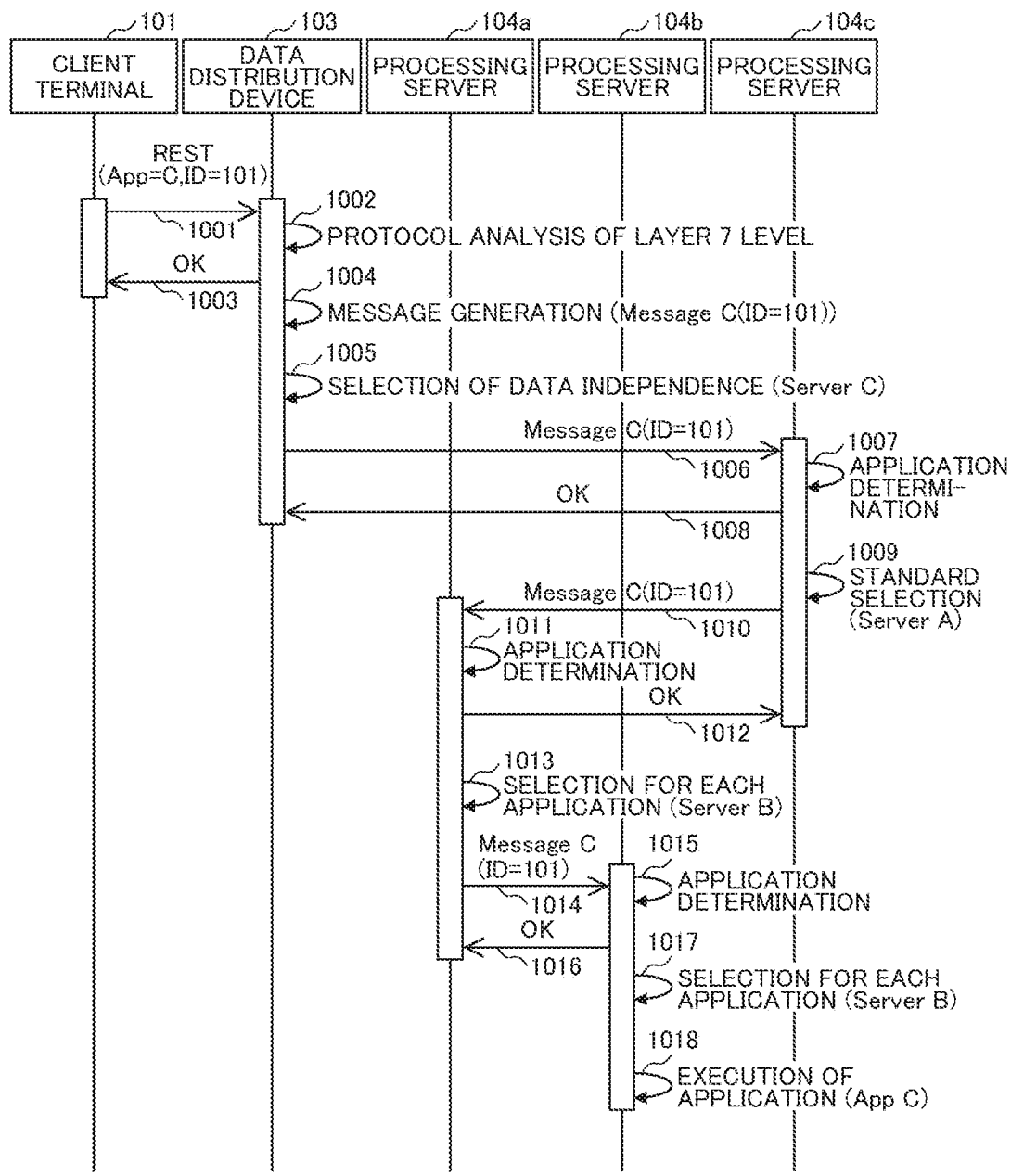
FIG. 10 is a diagram showing an example of an operation sequence of generating the message and transferring the generated message to the processing server by the data distribution device.
Figure 11:
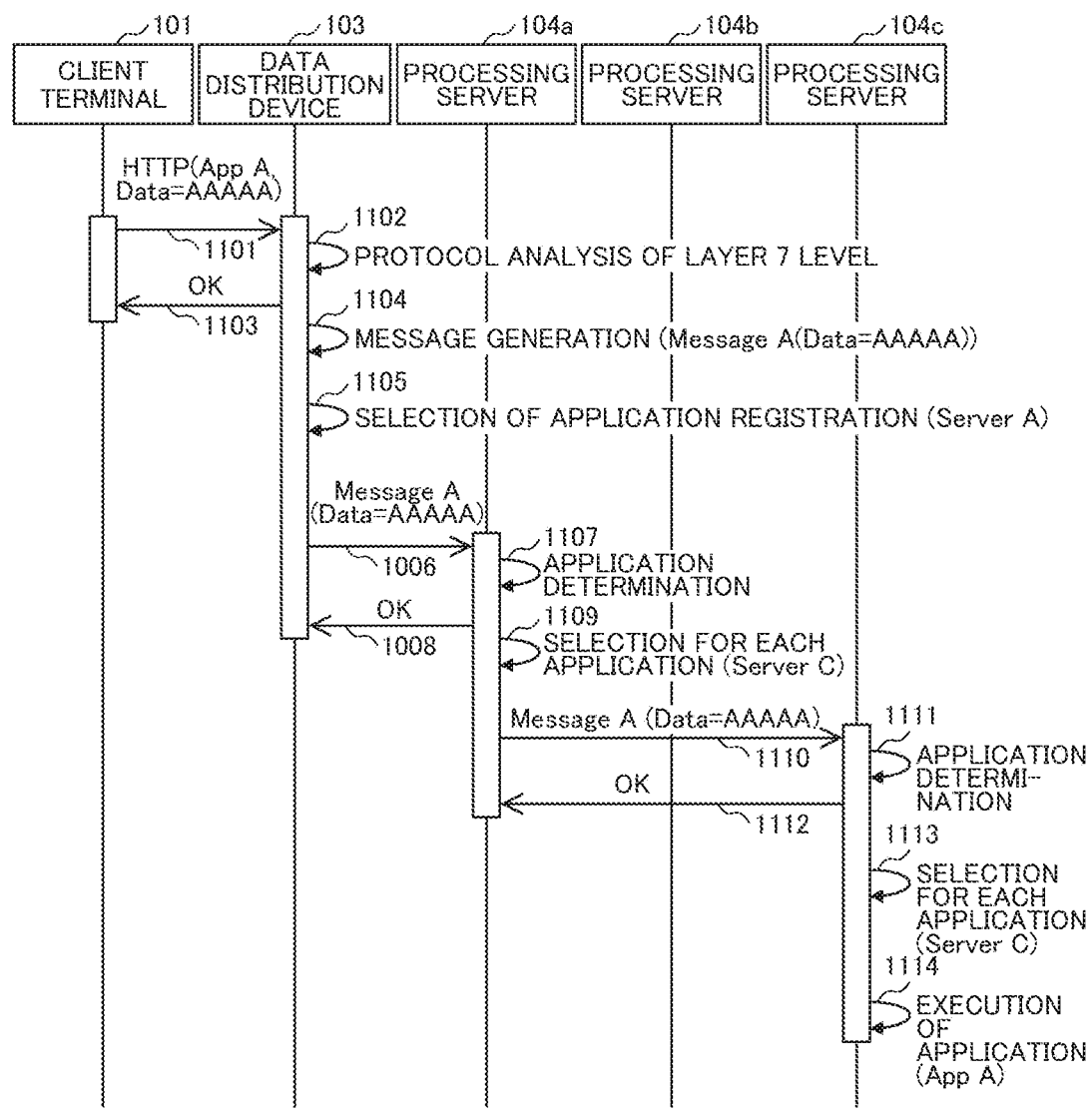
FIG. 11 is a diagram showing an example of an operation sequence for selecting any processing server for transferring by the data distribution device.
Figure 12:
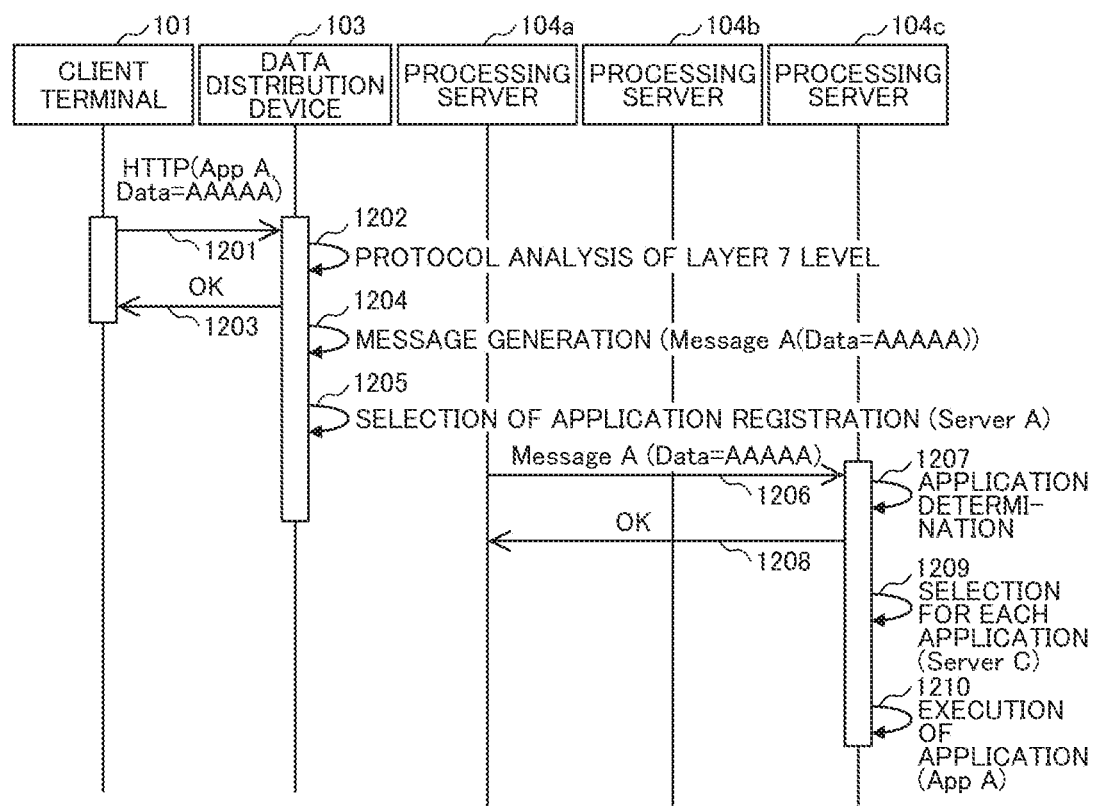
FIG. 12 is a diagram showing an example of an operation sequence for selecting any processing server for transferring through an application specific transfer determination process by the data distribution device.

FIGS. 10 to 12 show examples of the entire operation sequence of the system in response to a stepwise change in the processing contents of the data distribution device 103. Although the data distribution device 103 in each figure is physically the same device, the processing contents may be different since the setting is different. Alternatively, although the same reference numerals as those of the data distribution device 103 are used, the data distribution device 103 may be physically different in processing contents.

The processing servers 104*a*, 104*b*, and 104*c* are the same even if the drawings are different, and are the processing servers 104*a*, 104*b*, and 104*c*, which are described with reference to FIGS. 1 to 9. However, the operations of the processing servers 104*a*, 104*b*, and 104*c* are different since data or a message received by the processing servers 104*a*, 104*b*, and 104*c* is different depending on the drawings.

FIG. 10 shows an example of an operation sequence in which the data distribution device 103 performs the protocol analysis and the message generation, but transfers the message to the processing server 104 without identifying the application 261. First, the client terminal 101 transmits data 1001 having a transaction ID of "101" corresponding to "App C" with the use of REST as the protocol.

The data distribution device 103 analyzes the protocol of the layer 7 level of the received data 1001 (Step 1002), returns OK 1003 to the client terminal 101, and generates a message (Message C) (Step 1004). Then, the data distribution device 103 transfers the message to the processing server 104*c* that has been selected at random such as round robin without identifying the processing server 104 in which the application 261c (App C) corresponding to the message (Message C) is registered.

Upon receiving the message 1006, the processing server 104c identifies "App C" (application 261c) corresponding to the message 1006 (Message C) from the application-message management storage unit 221 (Step 1007) and returns OK 1008. Step 1009 to Step 1018 after "App C" has been identified are the same operation sequence as that in Step 909 to Step 918 described with reference to FIG. 9, and the processing server 104b calls the C processing execution unit 262c of the application 261c (App C) and processes the application.

In the example shown in FIG. 10, since the data distribution device 103 performs protocol analysis and message generation at the layer 7 level and transfers the message to the processing server 104 without identifying the application 261, the processing of the processing server 104c is lightened more than that in the example shown in FIG. 9, and the processing of the data distribution device 103 is lightened more than that when the data distribution device 103 further identifies the application 261. Further, there is no need to change the configuration or setting of the processing server 104c.

FIG. 11 shows an example of an operation sequence in which the data distribution device 103 selects and transfers the processing server 104 in which the application 261 has been registered. First, the client terminal 101 transmits the data 1101 in which data used for processing of the application 261a (App A) is "AAAAA" corresponding to "App A" with the use of HTTP as the protocol. In this example, "AAAAA" is information corresponding to the held cache information 602.

The data distribution device 103 analyzes the protocol of the layer 7 level of the received data 1101 (Step 1102), returns OK1103 to the client terminal 101, and also generates a message (Message A) (Step 1104). Next, the data distribution device 103 selects the processing server 104a in which "App A" has been registered (Step 1105). At this time, the data distribution device 103 selects the processing server 104a at random such as round robin from the processing servers 104a and 104c in which "AppA" has been registered, and transfers the message 1106.

Upon receiving the message 1106, the processing server 104a identifies "App A" (application 261a) corresponding to the message 1106 (Message A) from the application-message management storage unit 221 (Step 1107), and returns OK 1108. In addition, since there is a transfer determination process under a condition specific to the application 261a, the A application specific processing server selection unit (cache) 263a is called up and selects any processing server 104 (Step 1109).

In the above selection, since the data included in the message 1106 is "AAAAA", "Server C" (processing server 104c) is selected with reference to the App A transfer determination information storage unit (cache) 224a. According to the above selection, the processing server 104a further transfers the same message 1110 as the message 1106 to the processing server 104c.

Upon receiving the message 1110, the processing server 104c identifies the corresponding application 261a from the application-message management storage unit 221 as with the processing server 104a (Step 1111), and returns OK 1112. In addition, since there is a transfer determination process under a condition specific to the application 261a, the A application specific processing server selection unit (cache) 263a is called, selects the processing server 104c per se (Step 1113), calls the A processing execution unit 262a of the application 261a (App A), and processes the application (Step 1114).

The message is transferred to the processing server 104 in which the application 261 has been registered by the data distribution device 103. Therefore, in the received processing server 104, if there is a transfer determination processing under the condition specific to the application 261, the transfer may occur once, but the transfer never occurs twice as in the examples shown in FIGS. 9 and 10.

In the example of the operation sequence shown in FIG. 11, the data distribution device 103 performs the protocol analysis and the message generation, and further selects even the processing server 104 in which the application 261 corresponding to the message has been registered, so that the data distribution device 103 manages information corresponding to the server determination information storage unit 222. However, since the data distribution device 103 performs the round robin or the like without performing the transfer determination processing under the condition specific to the application 261, even if the type of the application 261 increases, the transfer determination processing load does not increase.

FIG. 12 shows an example of an operation sequence in which the data distribution device 103 performs the transfer determination process under the condition specific to the application 261, and selects and transfers the processing server 104. First, the client terminal 101 transmits data 1201 in which data used for processing of the application 261a (App A) is "AAAAA" corresponding to "App A" with the use of HTTP as the protocol.

The data distribution device 103 analyzes the layer 7 level protocol of the received data 1201 (Step 1202), returns OK 1203 to the client terminal 101, and generates the message (Message A) (Step 1204). Next, the data distribution device 103 selects the processing server 104 to be a transfer destination of the message (Message A) in the same process as that of the application specific processing server selection unit 263 (Step 1205).

For that purpose, the data distribution device 103 has information comparable to the App A transfer determination information storage unit (cache) 224a and information comparable to the server determination information storage section 222, and selects "ServerC" (processing server 104c) from "ServerA" and "ServerC" in which "App A" has been registered since the data is "AAAAA".

When the data distribution device 103 transfers a message 1206 and the processing server 104c receives the message 1206, Steps 1207 to 1210 are the same operation sequence as Steps 1111 to 1114 described with reference to FIG. 11, and the processing server 104c calls the A processing execution unit 262a and processes the application.

In the example of the operation sequence shown in FIG. 12, the data distribution device 103 performs the protocol analysis and the message generation, the application 261 corresponding to the message is registered, and a transfer determination process under the condition specific to the application 261 is performed for selection. Therefore, as the type of the application 261 increases, the transfer determination processing load of the data distribution device 103 increases. On the contrary, the processing server 104 reduces the processing load without occurrence of transfer.

As described above, as shown in FIGS. 9 to 12, even if a level of the processing load of the data distribution device 103 is changed, the processing server 104 can flexibly operate according to the change. In addition, even if the level of the processing load in the data distribution device 103 is set to a different processing load for each application 261, the processing server 104 can operate in accordance with the content received from the data distribution device 103 for each application 261.

For example, the data distribution device 103 may select and transfer the processing server 104 in which the application 261a has been registered in the application 261a (App A), and may select and transfer the processing server 104 by round robin without analyzing the protocol of the layer 7 level in the application 261b (App B).

The above operation is dynamically set from the operation management server, as a result of which, the operation management server may increase the processing load of the data distribution device 103 and minimize the number of processing servers 104 to perform the load dispersion when the amount of data is small or the number of the corresponding applications 261 is small, and may decrease the processing load of the data distribution device 103 in order from the application 261 having a larger amount of data in a stepwise manner when the amount of data increases.

With the above setting, an optimum load distribution system can be built as a whole, and finally a load distribution system capable of coping with a large number of applications 261 with a larger amount of data than that in the conventional art can be built.

REFERENCE SIGNS LIST

101: client terminal, 102: network, 103: data distribution device, 104: processing server, 105: deployment application management server

The invention claimed is:

1. A processing system comprising a data distribution server and a plurality of processing servers,
wherein the data distribution server receives application program data including information identifying an application program and transfers the received application program data or a message generated by the data distribution server from the received application program data to any one of the plurality of processing servers,
the processing server includes:
a server determination information storage unit that stores registration information on an application program of each of the plurality of processing servers and load information on each of the plurality of processing servers; and
an application specific transfer determination information storage unit that stores a condition unique to the application program, the condition indicating whether to transfer data between the processing servers, and
the processing server receives the application program data or the message including the information identifying the application program from the data distribution server,
in a case that the processing server receives the application program data, the processing server generates the message from the received application program data,
in a case that the processing server receives the message, the processing server identifies the application program from the received message,
the processing server selects any processing server from the plurality of processing servers based on the information stored in the server determination information storage unit and the application specific transfer determination information storage unit, the processing server executes the identified application program upon determining that the selected processing server is the processing server in question, and
the processing server transfers the received or generated message to the selected processing server upon determining that the selected processing server is not the processing server in question,
wherein the condition unique to the application program stored in the application specific transfer determination information storage unit includes information on cache data of each of the plurality of processing servers including a processing identifier of a transaction related to the application program.

2. The processing system according to claim 1,
wherein the processing server determines whether there is the condition unique to the identified application program upon determining that the identified application program has been registered in the processing server in question, and
the processing server selects any processing server from the plurality of processing servers based on both of the information stored in the server determination information storage unit and the information stored in the application specific transfer determination information storage unit upon determining that there is the condition unique to the identified application program.

3. The processing system according to claim 2,
wherein upon determining that there is the condition unique to the identified application program, the processing server identifies any processing servers that satisfy the condition unique to the identified application program from the plurality of processing servers based on the information stored in the application specific transfer determination information storage unit, and selects any processing server small in a load from the identified processing servers based on the information stored in the server determination information storage unit.

4. The processing system according to claim 3,
wherein the condition unique to the application program stored in the application specific transfer determination information storage unit includes information on transactions executed by each of the plurality of processing servers.

5. The processing system according to claim 1,
wherein the processing server determines whether there is the condition unique to the identified application program, or not, upon determining that the identified application program has been registered in the processing server in question, and
the processing server selects any processing server from the plurality of processing servers based on the information stored in the server determination information storage unit, upon determining that there is no condition unique to the identified application program.

6. The processing system according to claim 1,
wherein the processing server selects any processing server from the plurality of processing servers based on the information stored in the server determination information storage unit upon determining that the identified application program has not been registered in the processing server in question.

7. The processing system according to claim 1,
wherein the data distribution server receives data from a client terminal, analyzes a protocol of a layer 4 level protocol of the received data, and transfers the received data to one of the plurality of processing servers.

8. The processing system according to claim 1,
wherein the data distribution server receives data from a client terminal, analyzes a protocol of a layer 7 level protocol of the received data, generates a message from the received data, and transfers the generated message to one of the plurality of processing servers.

9. The processing system according to claim 1,
wherein the data distribution server receives data from a client terminal, analyzes a protocol of a layer 7 level of the received data, generates a message from the received data, selects any processing server registering the application program from the plurality of processing servers, and transfers the generated message to the selected processing server.

10. The processing system according to claim 1,
wherein the data distribution server receives data from a client terminal, analyzes a protocol of a layer 7 level of the received data, generates a message from the received data, identifies some processing servers registering the application program from the plurality of processing servers, further selects a processing server that satisfies the condition unique to the application program from the identified processing servers, and transfers the generated message to the selected processing server.

11. A non-transitory computer-readable medium storing a program that is executed by a processing server which is connected to a data distribution server and other processing servers and has an interface with an execution platform and an interface with an application program, the program causing the processing server to
acquire a message received from the data distribution server or the other processing servers from the execution platform and identifies the application program,
cause the identified application program to select any processing server upon determining that there is a condition unique to the identified application program, the condition indicating whether to transfer data between the processing servers,
select any processing server according to the processing server according to loads of the processing server in question and the other processing servers upon determining that there is no condition unique to the identified application program,
transfer a message to the selected other processing server upon determining that the other processing server has been selected, and
cause the identified application program to execute processing upon determining that the processing server in question has been selected,
wherein the condition unique to the application program stored in the application specific transfer determination information storage unit includes information on cache data of each of the plurality of processing servers including a processing identifier of a transaction related to the application program.

12. The processing system according to claim 1,
wherein the message includes information identifying a combination of types of multiple pieces of data to be transferred.

13. The processing system according to claim 1,
wherein the message includes information identifying a combination of variable names of multiple pieces of data to be transferred.

* * * * *